June 21, 1949.  R. F. WILD  2,474,177
CATHODE-RAY INDICATOR
Filed April 17, 1947  5 Sheets-Sheet 1
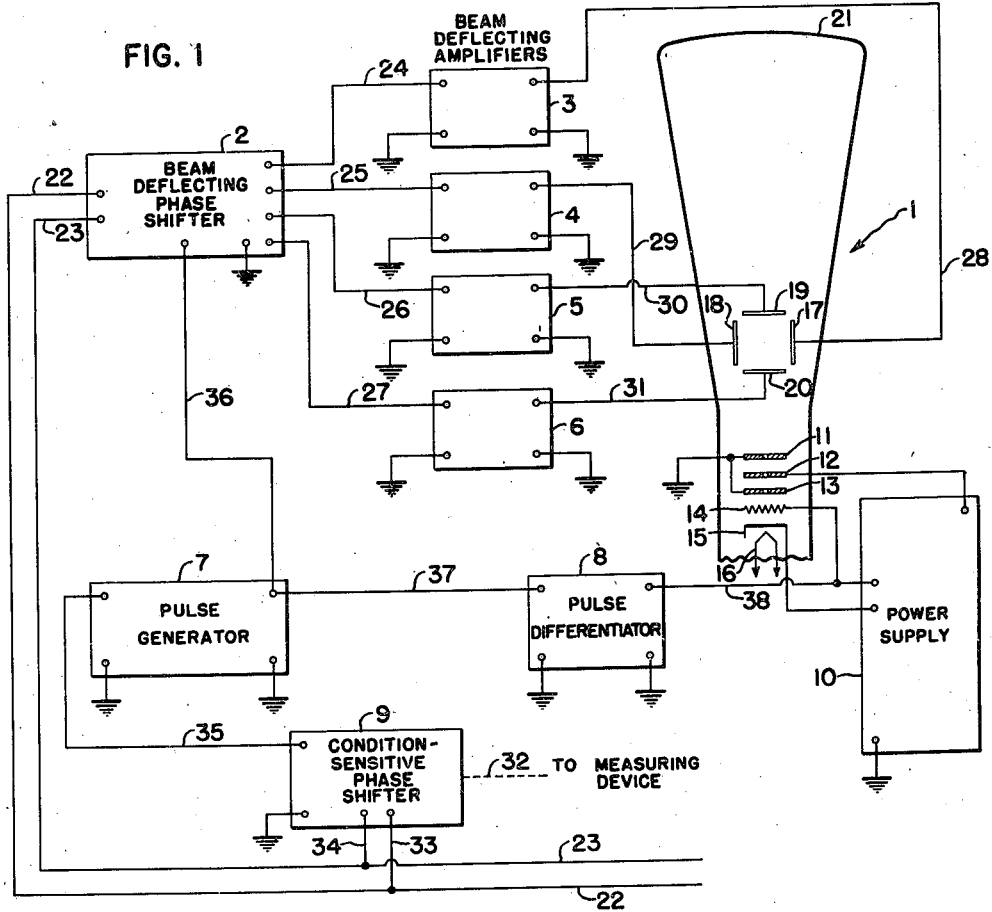
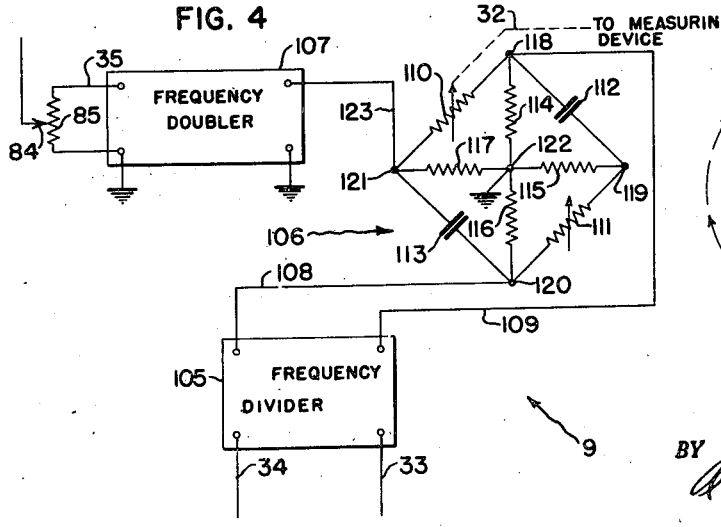
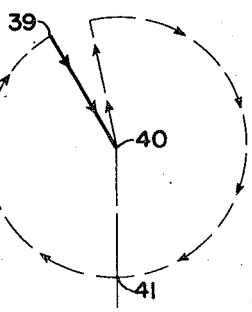
*INVENTOR.*
RUDOLF F. WILD
BY *Arthur H. Swanson*
ATTORNEY June 21, 1949.　　　　R. F. WILD　　　　2,474,177
CATHODE-RAY INDICATOR Filed April 17, 1947　　　　　　　　　　5 Sheets-Sheet 2

*INVENTOR.*
RUDOLF F. WILD

BY Arthur H. Swanson

ATTORNEY

*INVENTOR.*
RUDOLF F. WILD
BY Arthur H. Swanson
ATTORNEY

June 21, 1949.  R. F. WILD  2,474,177
CATHODE-RAY INDICATOR
Filed April 17, 1947  5 Sheets-Sheet 4
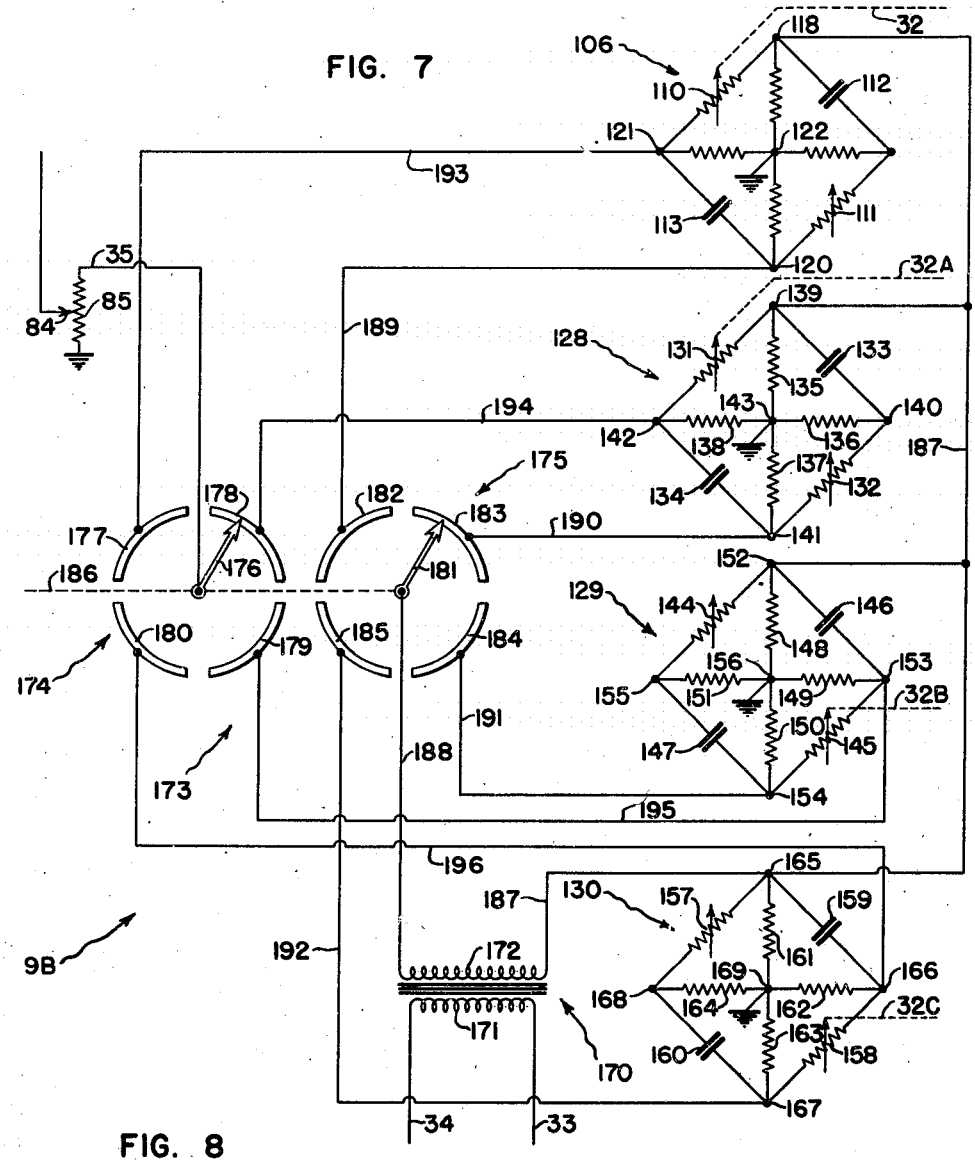
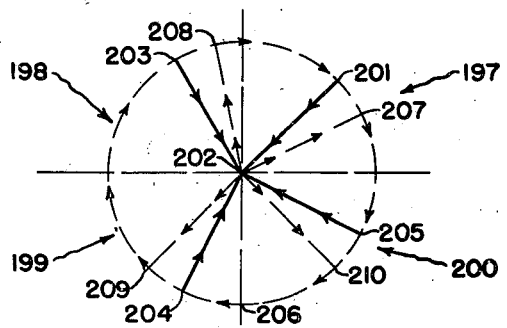
INVENTOR.
RUDOLF F. WILD
BY Arthur H. Swanson
ATTORNEY June 21, 1949.    R. F. WILD    2,474,177
CATHODE-RAY INDICATOR
Filed April 17, 1947    5 Sheets-Sheet 5
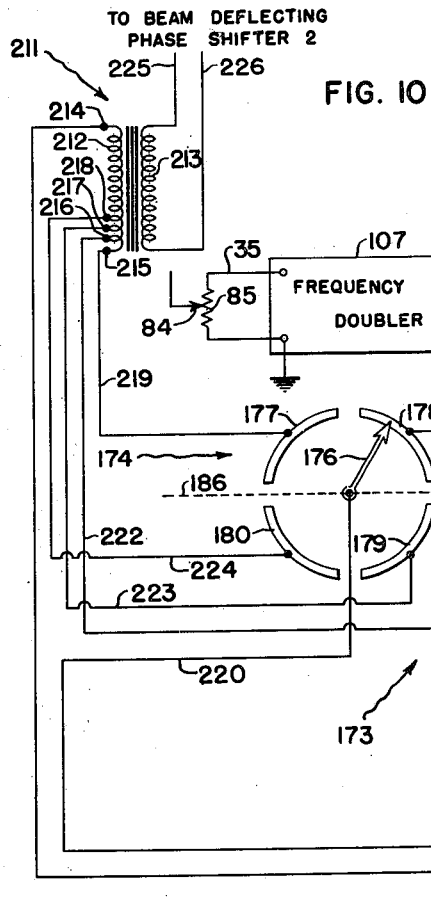
FIG. 10
FIG. 11
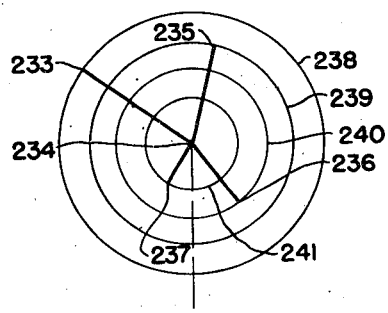
*INVENTOR.*
RUDOLF F. WILD
BY *Arthur H. Swanson*
ATTORNEY Patented June 21, 1949

2,474,177

UNITED STATES PATENT OFFICE 2,474,177

CATHODE-RAY INDICATOR

Rudolf F. Wild, Philadelphia, Pa., assignor, by mesne assignments, to Minneapolis-Honeywell Regulator Company, Minneapolis, Minn., a corporation of Delaware Application April 17, 1947, Serial No. 742,081

29 Claims. (Cl. 177—351)

The present invention relates generally to indicators of the type comprising an indicating pointer and a cooperating scale, and, more specifically, relates to indicators of the cathode ray type especially adapted for use in telemetering and analogous systems and characterized by their practically inertialess response, high accuracy, and lack of sensitivity to vibration.

The general object of the present invention is to provide an improved indicator of the type comprising an indicating pointer and a cooperating scale which is especially adapted for use in telemetering and analogous systems. A primary object of the invention is to provide an indicator of the cathode ray type wherein the indicating pointer is in the form of a luminous line on the fluorescent screen of the cathode ray tube and hence exhibits practically inertialess response to demands for change in position.

A specific object of the invention is to provide novel and effective control means for an indicator of the type just specified, which means are operative to energize and deenergize the means for creating and positioning the luminous pointer line and are thereby operative to position the line on the screen of the cathode ray tube in a position which at all times corresponds to the character of the control signal on the indicator. This control signal may, for example, indicate or correspond to the measured value of some quantity, such as a temperature or a pressure, or this signal may indicate the relative position of a distant element, such as the indicating pointer of a remote measuring instrument. The luminous pointer line is provided in the plane of the screen of the cathode ray tube and is perpendicular to the axis of the tube.

Another specific object of the present invention is to provide a cathode ray indicator of the type previously specified which is characterized by its exceptionally long scale length and resulting high accuracy of indication. In a preferred form of the present invention, the scale extends over nearly 360 degrees of arc. This feature also provides a means for permitting substantially different values of an indicated condition to be shown on a single continuous scale.

Still another specific object of the invention is to provide a multiple indicator of the cathode ray type including novel means whereby a plurality of luminous pointer lines are provided on the screen of the cathode ray tube, each pointer being constantly controlled by one of a plurality of conditions being measured. In one form of such a multiple indicator, each luminous pointer line is restricted in its motion on the cathode ray tube screen to definitely different predetermined sections of the scale or areas of the screen. Hence each of these sections of the scale or screen areas corresponds to one of the conditions whose value is to be indicated. In another form of such a multiple indicator, each luminous pointer line is of a different length, there being a different coaxial scale provided to cooperate with each of these pointers and to represent the values of each of the indicated conditions.

A further specific object of the invention is to provide an indicator of the type specified which is unaffected in its operation and accuracy of indication by extraneous vibration, shocks, and position while operating, which is easily read under adverse conditions of illumination, and which is characterized by a practically instantaneous response to changes in the value of the indicated condition.

In a preferred form of the present invention, use is made of a cathode ray tube of conventional design which includes means operative, when suitably energized, to produce an electron beam which in turn produces a luminous spot on the fluorescent coating or screen of the cathode ray tube. This luminous spot is caused to sweep periodically from the outside of the screen to the center thereof, one such sweep occurring during each cycle of the alternating voltage utilized to energize the apparatus, and each sweep producing a luminous pointer line on the screen which extends from the outside to the center thereof. The time interval between each of these sweeps and the start of the corresponding cycle is adjusted by the instantaneous value of the condition which is to be indicated, hence the luminous pointer appears constantly on the screen, extending from the center thereof at an angle, with a fixed radial line, which is determined by the instantaneous value being indicated. The outer circumference of the screen may be advantageously provided with a calibrated scale which cooperates with the outer end of the luminous pointer to provide a direct reading of the indicated value.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Of the drawings:

Fig. 1 is a diagram illustrating the principal components of one embodiment of the present invention;

Fig. 2 is a diagram illustrating a typical position of the luminous pointer on the screen of the cathode ray tube of the system of Fig. 1;

Fig. 4 is a circuit diagram illustrating in detail a portion of the system of Figs. 1 and 3;

Figs. 6 and 7 are circuit diagrams illustrating in detail other forms of the apparatus of Fig. 4;

Fig. 8 is a diagram illustrating typical positions of the luminous pointer on the cathode ray tube screen when the system of Figs. 1 and 3 includes apparatus of the form illustrated in Fig. 7;

Fig. 10 is a circuit diagram illustrating still another form of the apparatus of Fig. 4; and Fig. 11 is a diagram illustrating typical positions of the luminous pointer on the cathode ray tube screen when the system of Figs. 1 and 3 includes apparatus of the form illustrated in Fig. 10.

Figure 3:
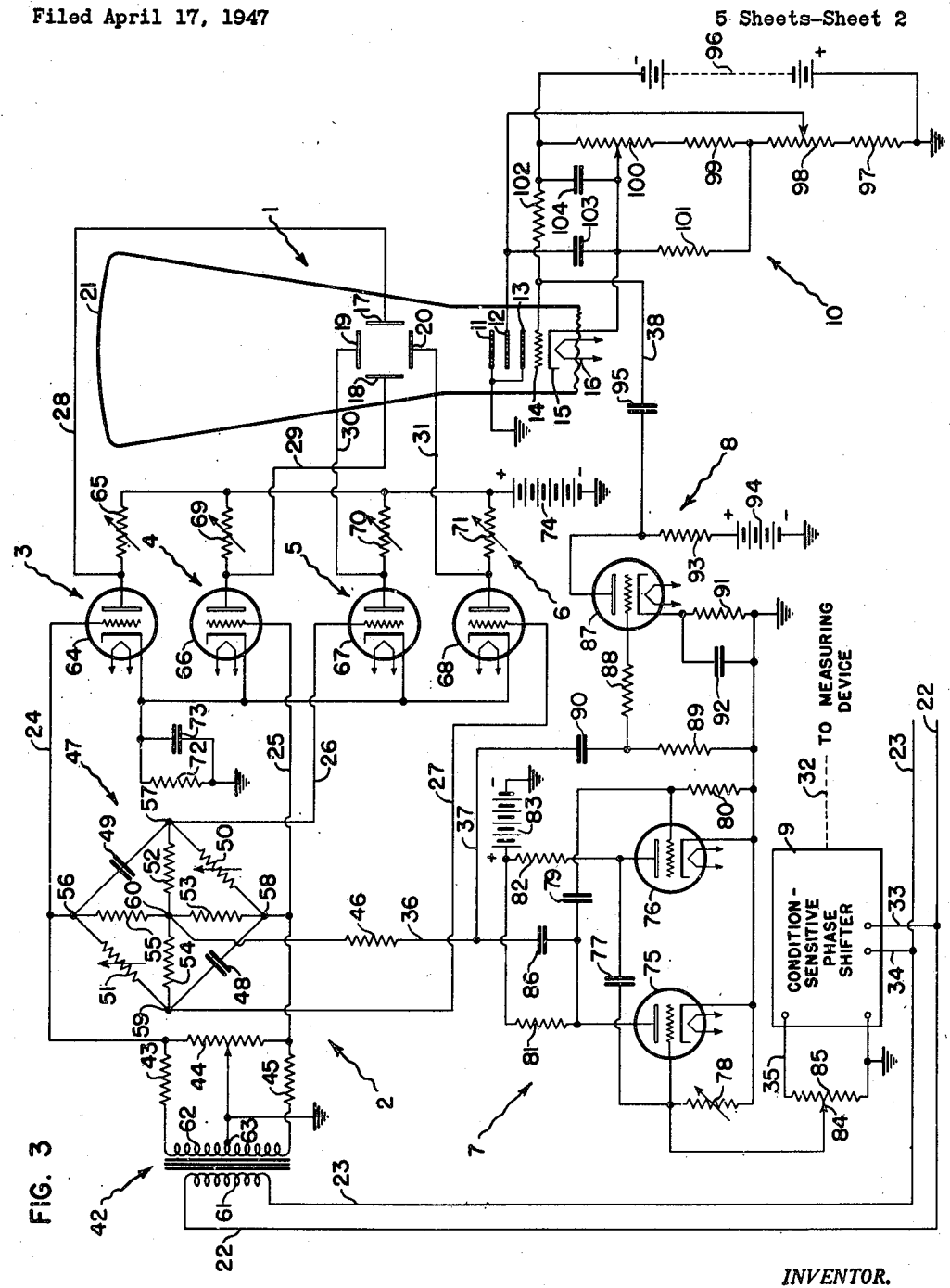
Fig. 3 is a circuit diagram of the system of Fig. 1.

The embodiment of the present invention illustrated in Fig. 1 by way of example comprises a cathode ray tube 1, which may well be a type 5BP1 tube, a beam deflecting phase shifter 2, beam deflecting amplifiers 3, 4, 5, and 6, a pulse generator 7, a pulse differentiator 8, a condition-sensitive phase shifter 9, and a cathode ray tube power supply 10. The cathode ray tube 1 comprises anodes 11, 12, and 13, a control grid 14, a cathode 15, a cathode heater 16, electron beam deflecting plates 17, 18, 19, and 20, and a fluorescent coated screen 21.

The beam deflecting phase shifter 2 is supplied with energizing voltage by supply conductors 22 and 23 which are connected to the input of the phase shifter 2. The conductors 22 and 23 supply alternating current of commercial voltage and frequency from an external source, not shown. For purposes of explanation, it is assumed herein that the conductors 22 and 23 supply alternating current at 115 volts, 60 cycles.

The output of the phase shifter 2 is connected to the inputs of the beam deflecting amplifiers 3, 4, 5, and 6 by means of conductors 24, 25, 26, and 27, respectively. The outputs of the amplifiers 3, 4, 5, and 6 are respectively connected to the beam deflecting plates 17, 18, 19, and 20 of the cathode ray tube by respective conductors 28, 29, 30, and 31. The elements 11, 12, 13, 14, 15, and 16 of the tube 1 are connected to and suitably energized by the power supply 10.

The value of the condition being measured, which value is to be indicated on the screen of the tube 1, is transmitted to the condition-sensitive phase shifter 9 by a linkage 32. This linkage may be electrical, mechanical, pneumatic, or of any other suitable form, and may connect the phase shifter 9 to a remote or local measuring device or indicating instrument. The input of the phase shifter 9 is connected to the supply conductors 22 and 23 by branch supply conductors 33 and 34, and the phase shifter output is connected to the control input of the pulse generator 7 by a conductor 35.

The output of the pulse generator 7 is connected by a conductor 36 to the control input of the beam deflecting phase shifter 2, and is also connected by a conductor 37 to the input of the pulse differentiator 8. The output of the latter is connected to the control grid 14 of the tube 1 by a conductor 38. In all of the connections of the circuit of Fig. 1 just described, the various circuits are completed through common ground return connections as shown.

In the operation of the system of Fig. 1, the cathode ray tube 1 is normally energized but is maintained in a non-conductive state by its power supply 10. Once during each cycle of the alternating supply voltage, however, the tube 1 is permitted to conduct for a short period and to produce thereby an electron beam and a corresponding luminous trace on the screen 21. During the time that the tube 1 is non-conductive and is not producing any effect on the screen 21, the deflecting plates 17, 18, 19, and 20 are supplied with energizing voltages from the phase shifter 2 and amplifiers 3, 4, 5, and 6 which have such relative phase relationships that the deflecting plates would be operative to deflect the electron beam to cause a circular trace to appear on the screen 21, if the tube 1 were conductive and producing an electron beam during that time. However, immediately after the instant that the tube 1 is made conductive and an electron beam is produced, the deflecting plates are deenergized, with the result that a luminous trace is produced on the screen 21 as the deflected electron beam moves from its deflected position, which it occupies at the instant it is first produced, to an undeflected position which is approximately at the geometrical center of the screen 21.

The precise instant during each cycle of the supply voltage at which the tube 1 is made conductive and a trace is produced on the screen 21 is determined by the instantaneous value of the condition which is to be indicated. Consequently, the angular position around the screen center of the luminous trace or pointer line on the screen is determined by and is an indication of this measured value of the condition.

At the instant that the electron beam reaches its undeflected position, the tube 1 is once more made non-conductive, and the deflecting plates are once more supplied with the deflecting voltages. Consequently, the luminous pointer line terminates at approximately the center of the screen 21, whereafter the deflecting plates are operative to cause the electron beam and the luminous pointer line again to move inwardly from the deflected position at the instant during the succeeding cycle of the supply voltage at which the tube 1 is again made conductive.

A typical luminous pointer line produced in the manner just described for a given value of the indicated condition is represented in the diagram of Fig. 2 by the heavy line 39—40. The light dashed line 40—41—39 represents the path over which the electron beam would produce a circular trace if the tube 1 were conductive and producing an electron beam at all times. Assuming that the operating cycle of the system starts at the point 41, it can be seen that a luminous trace would be produced over the path 41—39 if the tube 1 were then conductive. Since the tube 1 is not conductive at this time, no trace is produced until the time that point 39 is reached. At this instant, the tube is made conductive, and a luminous pointer line appears, starting at the point 39. Since the deflecting means are deenergized immediately after this same instant, the pointer line extends from the point 39 to the point 40, as the deflected electron beam moves from its fully deflected position at point 39 to the point of no deflection at 40. At the instant that the pointer line reaches the point 40, the tube 1 is again made non-conductive, and the deflecting means are once more energized. Hence the pointer line terminates at the point 40, and the path over which the deflecting means would cause a trace to be produced if the tube 1 was allowed to remain conductive is shown extending from point 40 out and around to point 41, completing the operating cycle. As was previously mentioned, the time which elapses between the point 41 and the point 39 is a function of the value of the condition to be indicated, hence the angular position of the luminous pointer line 39—40 relative to a reference line, such as the straight line 41—40, is an indication of this value.

The manner in which the system of Fig. 1 functions to produce the effects just described will now be explained. The beam deflecting phase shifter 2 is operative to produce from the alternating energizing voltage supplied by the conductors 22 and 23 four voltages which are 90 degrees apart in phase. Each of these voltages is amplified by a respective one of the amplifiers 3, 4, 5, and 6, and is applied to a respective one of the deflecting plates 17, 18, 19, and 20. The voltages applied to the plates 17 and 18 are 180° apart in phase, as are the voltages applied to the plates 19 and 20. However, the voltages applied to the plates 17 and 20 are 90° apart in phase as are the voltages on the plates 20 and 18, 18 and 19, and 19 and 17. As is well known to those skilled in the art, the application of such voltages of the correct magnitudes to the deflecting plates of a cathode ray tube causes an electrostatic field to be set up between these plates which is operative to deflect an electron beam, produced by the tube, in such a manner as to produce a circular luminous trace on the screen of the tube.

The condition-sensitive phase shifter 9 is operative to produce an output voltage having a phase relationship with the supply voltage of conductors 22 and 23 which is determined by the value of the condition to be indicated as transmitted to the phase shifter 9 by the linkage 32. This output voltage is applied to control the pulse generator 7, which is operative to produce a negative pulse once during every cycle of the supply voltage, the exact time at which the pulse is produced during any cycle being determined by the then existing phase difference between the output voltage of the phase shifter 9 and the supply voltage. Consequently, a pulse is produced by the generator 7 once during each cycle of the supply voltage at a time, after the start of each cycle, which is determined by the then existing value of the condition to be indicated.

The pulses produced by the generator 7 are utilized to control the beam deflecting phase shifter 2 and to control the conductivity of the tube 1. To this end, these pulses are applied to the phase shifter 2 in such a manner as to cause the deflecting plates 17, 18, 19, and 20 to be de-energized and incapable of deflecting an electron beam upon the occurrence of each pulse. Simultaneously, the pulses are applied to the pulse differentiator 8 which in turn operates upon the occurrence of each pulse to cause the tube 1 to become conductive and produce an electron beam.

From what has just been described, it is evident that at a certain time from the beginning of each cycle of the supply voltage, this time depending on the value of the measured condition, a pulse is produced by the generator 7, in response to the phase-displaced voltage output of the phase shifter 9, which pulse acts to cause an electron beam to be produced in the tube 1 and at the same time acts to cause this beam to be returned from a deflected position to an undeflected position. This motion of the electron beam in the tube 1 produces on the screen 21 of the tube the luminous pointer line which, by its position on the screen 21, indicates the value of the measured condition.

The length of the pulses produced by the generator 7 is adjusted to be such that at the instant the cathode ray tube electron beam reaches its undeflected position and the luminous pointer line is extended to the center of the screen 21, the pulse will have decayed to such a value that the tube 1 will instantly be made non-conductive and the deflecting plates 17, 18, 19, and 20 will be again made operative, so that the system will be ready for the pulse which will be produced during the succeeding operating cycle.

The circuit diagram of Fig. 3 shows by way of example typical forms which the various portions of the system of Fig. 1 may take. In Fig. 3, the beam deflecting phase shifter 2 is shown as comprising a transformer 42, resistors 43, 44, 45, and 46, and a reactance bridge circuit 47. The transformer 42 is utilized to supply the bridge 47 with energizing voltage from the supply conductors 22 and 23, and the bridge 47 is operative to produce from this energizing voltage four voltages which are 90° apart in phase.

The bridge 47 includes condensers 48 and 49, and resistors 50, 51, 52, 53, 54, and 55, connected in the following manner. To a bridge point 56 there are connected one terminal of the resistor 51 and one terminal of the condenser 49, and to a point 57 there are connected the other terminal of the condenser 49 and one terminal of the resistor 50. To a point 58 there are connected the other terminal of the resistor 50 and one terminal of the condenser 48, and to a point 59 there are connected the other terminals of the condenser 48 and the resistor 51. One terminal of each of the resistors 52, 53, 54, and 55 is connected, respectively, to one of the points 57, 58, 59, and 56, the remaining terminals of these resistors being connected to a point 60.

The transformer 42 comprises a line voltage primary winding 61 and a secondary winding 62 which is center-tapped at 63. This center-tap is connected to ground and forms the common output terminal of the phase shifter 2. One end terminal of the secondary winding 62 is connected through the resistor 43 to the bridge point 56, and the other end terminal of this winding is connected through the resistor 45 to the bridge point 58. The resistor 44 is connected between the bridge points 56 and 58, and a sliding contact which engages the resistor 44 is connected to ground.

The beam deflecting amplifier 3 comprises a triode electron tube 64, which may be of the 7B4 type, and a variable plate load resistor 65. The amplifiers 4, 5, and 6 may be identical to the amplifier 3, comprising triodes 66, 67, and 68, respectively, and variable plate load resistors 69, 70, and 71, respectively. Each of the triodes 64, 66, 67, and 68 includes a plate, a control grid, a cathode, and a cathode heater, and the cathodes of these triodes are connected together and to ground through a common cathode bias resistor 72. A cathode by-pass condenser 73 is connected in parallel with the resistor 72.

The control grids of the triodes 64, 66, 67, and 68 are respectively connected to the bridge points 56, 58, 57, and 59 by the respective conductors 24, 25, 26, and 27. The plates of the triodes 64, 66, 67, and 68 are connected through their respective plate load resistors 65, 69, 70, and 71 to the positive terminal of a source of plate supply voltage, which may be a battery 74, as shown. The negative terminal of this battery is connected to ground. The plates of the triodes 64, 66, 67, and 68 are also connected, respectively, to the deflecting plates 17, 18, 19, and 20 of the tube 1 by the respective conductors 28, 29, 30, and 31, and the cathode heaters of these triodes are suitably energized from a source which is not shown in Fig. 3.

The bridge 47, when energized from the transformer 42, is operative to produce four output voltages which have such relative phase relationships that the required deflecting voltages are applied to the cathode ray tube deflecting plates. To this end, the voltage applied between the control grid and the cathode of the triode 67 is 90° out of phase with respect to the voltage applied between the control grid and the cathode of the triode 64. Likewise, the voltage applied to the triode 66 is 90° out of phase with respect to the voltage applied to the triode 67, and the voltage applied to the triode 68 is 90° out of phase with the voltage applied to the triode 66. Consequently, the deflecting plate 19 is energized with voltage which is 90° out of phase with the voltage on the plate 17, the voltage on the plate 18 is 90° out of phase with the voltage on the plate 19, and the voltage on the plate 20 is 90° out of phase with the voltage on the plate 18. The manner in which such voltages will cooperate to deflect an electron beam in a cathode ray tube so that the beam produces a circular trace on the tube screen is well known to those skilled in the art, as mentioned hereinbefore.

The plate load resistors 65, 69, 70, and 71 are advantageously made variable so as to permit the voltages applied to the cathode ray tube deflecting plates to be relatively varied so that the desired deflecting action can be obtained. Likewise, the bridge resistors 50 and 51 are made variable so that the desired output voltage phase can be obtained. The bridge circuit 47, as well as its operation to produce the out-of-phase voltages specified, is well known to those skilled in the art, and hence requires no further explanation herein.

The pulse generator 7 is shown in Fig. 3 in the form of a conventional multivibrator circuit, comprising triode electron tubes 75 and 76. These triodes may also be of the 7B4 type, each comprising a plate, a control grid, a cathode, and a cathode heater. The control grid of the triode 75 is coupled to the plate of the triode 76 through a coupling condenser 77, and is connected to ground through a variable grid resistor 78. The control grid of the triode 76 is connected through a coupling condenser 79 to the plate of the triode 75, and is connected to ground through a grid resistor 80. The plates of the triodes 75 and 76 are connected through respective plate load resistors 81 and 82 to the positive terminal of a source of plate supply voltage, which is shown as being a battery 83. The negative terminal of the latter is connected to ground.

The input to the generator 7 is connected to the output of the phase shifter 9, the control grid of the triode 75 being connected to the sliding contact 84 of a variable resistor 85, and the latter being connected across the output of the phase shifter 9, between the conductor 35 and ground. The output of the generator 7 is connected to the bridge 47 of the phase shifter 2 and to the differentiator 8, a condenser 86 being connected between the plate of the triode 75 and the conductors 36 and 37. The conductor 36 is connected to one terminal of the resistor 46, the other terminal of which is connected to the point 60 of the bridge 47, and the conductor 37 is connected to the input of the differentiator 8.

In a manner well known to those skilled in the art, the multivibrator circuit of the generator 7 is operative to produce periodic surges of plate current through the plate load resistor 81. Such a surge of current occurs once during each cycle of the supply voltage, since the multivibrator is synchronized at supply voltage frequency through the connection between the control grid of the triode 75 and the output of the phase shifter 9. Each surge of plate current through the resistor 81 produces a pulse of voltage between the conductors 36 and 37, and ground, which pulse causes the conductors 36 and 37 to be driven negative with respect to ground. The time after the start of each cycle at which a pulse is produced during that cycle is a function of the then existing phase of the synchronizing voltage, supplied to the multivibrator circuit from the phase shifter 9, relative to the phase of the supply voltage of conductors 33 and 34.

At the instant that a negative pulse is produced by the generator 7, it is applied to the control grids of the amplifying triodes 64, 66, 67, and 68 through the circuit 47, causing these triodes to be cut off. This in turn causes the deflecting plates of the tube 1 to be deenergized. The pulse is also applied to the input of the differentiator 8. This latter comprises a triode electron tube 87, which may be of the 7B4 type, having a plate, a control grid, a cathode, and a cathode heater.

The control grid of the tube 87 is connected to ground through grid resistors 88 and 89, connected in series. The junction between these resistors is connected through a coupling condenser 90 to the conductor 37, by means of which the pulses are applied to the differentiator 8. The cathode of the tube 87 is connected to ground through a cathode bias resistor 91 and a by-pass condenser 92, connected in parallel with the latter. The plate of the tube 87 is connected through a plate load resistor 93 to the positive terminal of a source of plate supply voltage, which is shown as being a battery 94. The negative terminal of the latter is connected to ground. The cathode heater of the tube 87, as well as those of the triodes 75 and 76, is supplied with energizing voltage from a suitable source, not shown in Fig. 3.

The plate of the tube 87 is connected to the control grid 14 of the tube 1 through a coupling condenser 95. This control grid is normally biased negatively with respect to the cathode 15, so that the no luminous trace is normally produced on the screen 21 as previously described. This negative bias applied to the grid 14 is derived from the power supply 10, which is shown as comprising a battery 96, resistors 97, 98, 99, 100, 101, and 102, and condensers 103 and 104. The resistors 97, 98, 99, and 100 are connected in series across the battery 96 to form a voltage dividing circuit, one terminal of the resistor 97 being connected to the positive terminal of the battery 96 and to ground, and one terminal of the resistor 100 being connected to the negative terminal of the battery 96.

The tube 1 receives energizing voltage as well as grid bias voltage from the supply 10. To this end, the control grid 14 is connected to the negative terminal of the battery 96 through the resistor 102. A sliding contact engaging the resistor 100 is connected to the cathode 15, making the latter positive with respect to the grid 14. The condenser 104 is connected between the cathode 15 and the negative terminal of the battery 96. A sliding contact engaging the resistor 99 is connected to the anode 12, making the latter highly positive with respect to the cathode 15. The condenser 103 is connected between the anode 12 and the cathode 15, and the resistor 101 is connected between the cathode 15 and the junction between the resistors 98 and 99. The anodes 11 and 13 are connected to ground as before.

When a negative pulse is applied to the input of the differentiator 8, the latter operates to differentiate and invert the pulse, causing a sharp positive pulse to be applied to the control grid 14. This pulse temporarily overcomes the negative bias normally applied to this grid, and hence drives the latter momentarily positive with respect to the cathode 15. This in turn causes the luminous spot to appear on the screen 21 just before the deflecting plates of the tube 1 are de-energized, and causes the luminous pointer line to be produced on the screen as previously described. Due to the electrical inertia of the deflecting system, the production of the luminous spot always proceeds the actual deenergization of the deflecting plates. Consequently, the spot is initially produced in a deflected position.

As the pulse produced by the generator 7 decays, the amplifiers 3, 4, 5, and 6 are unblocked, and simultaneously a sharp negative pulse is produced by the discriminator 8. This negative pulse is applied to the grid 14 and instantly returns the tube 1 to its normal non-conductive condition, thereby causing no luminous trace to appear on the screen 21 as the deflecting plates of the tube 1 are again energized. The deflecting plates then remain energized, and the tube 1 remains non-conductive until a subsequent pulse is produced by the generator 7 during the succeeding cycle of the alternating supply current.

There is illustrated in Fig. 4 the circuit diagram of a preferred form of the condition-sensitive phase shifter 9 of Figs. 1 and 3. As shown, the phase shifter comprises a frequency divider 105, a reactance bridge circuit 106, and a frequency doubler 107. The frequency divider 105 has input terminals to which are connected the branch supply conductors 33 and 34, and has output terminals to which are connected conductors 108 and 109. The frequency divider 105 may be of any of the various forms of such apparatus, well known to those skilled in the art, which are operative, when supplied with alternating current, to produce an alternating current output signal having a frequency which is one-half that of the supplied alternating current, and which is not shifted in phase with respect to the latter. Such apparatus, for example, is disclosed in the U. S. patent to Seeley, No. 2,403,559, or may comprise a conventional 30 cycle multivibrator, synchronized at 60 cycles, and working into a 30 cycle filter.

The frequency divider 105 of Fig. 4 is operative to produce between the output conductors 108 and 109, an alternating current signal having a frequency of 30 cycles per second and being in phase with the 60 cycle alternating current supplied by the conductors 33 and 34. This 30 cycle signal is applied to the input of the reactance bridge circuit 106.

The bridge 106 is similar to the bridge 47 of the beam deflecting phase shifter 2, comprising variable resistors 110 and 111, condensers 112 and 113, and fixed resistors 114, 115, 116, and 117. One terminal of the resistor 110 is connected to one terminal of the condenser 112 at an input terminal 118, and the other terminal of the condenser 112 is connected to one terminal of the resistor 111 at a terminal 119. The other terminal of the resistor 111 is connected to one terminal of the condenser 113 at an input terminal 120, and the other terminal of the condenser 113 and that of the resistor 110 are connected together at an output terminal 121. One terminal of each of the resistors 114, 115, 116, and 117 is connected to one of the bridge terminals 118, 119, 120, and 121, respectively. The other terminals of the resistors 114, 115, 116, and 117 are connected together at an output terminal 122.

The frequency doubler 107 has input terminals which are connected to the output of the bridge 106, and has output terminals between which is connected the variable resistor 85 of Fig. 3. The doubler 107 may be of any of the various forms of such apparatus, well known to those skilled in the art, which are operative, when supplied with alternating current, to produce an alternating current output signal having a frequency which is twice that of the supplied alternating current and which is not shifted in phase with respect to the latter. Such apparatus, for example, is disclosed in the U. S. patent to Norton, No. 2,253,575.

The frequency doubler 107 of Fig. 4 is supplied with 30 cycle alternating current from the bridge 106. To this end, the bridge output terminal 121 is connected by a conductor 123 to one of the input terminals of the doubler 107. The other input terminal of the latter is connected to the bridge output terminal 122 through a common ground connection. The bridge 106, in turn, is supplied with 30 cycle alternating current from the frequency divider 105 as previously mentioned, the bridge input terminal 118 being connected by the conductor 109 to one of the output terminals of the divider 105, and the other output terminal of the latter being connected by the conductor 108 to the bridge input terminal 120.

The frequency doubler 107 is operative to produce across the resistor 85 a 60 cycle signal which is in phase with the 30 cycle input signal supplied by the bridge 106. However, the output signal of the doubler differs in phase from the bridge input signal and the supplied 60 cycle alternating current by amounts which are dependent on the values of the components of the bridge 106. By varying the value of one of these components in response to variations in the value of the quantity being measured, the output signal of the doubler 107 and phase shifter 9 is varied in phase with respect to the alternating supply current as necessary to produce the operation of the apparatus of Figs. 1 and 3, as previously described.

The output signal of the bridge 106 is varied in phase with respect to the bridge input signal by means of the variable resistor 110. This resistor is shown as being connected by the linkage 32 to the measuring device, not shown, in such a manner that the resistor 110 is adjusted in accordance with the value of the measured condition. In a manner well known to those skilled in the art, the phase angle between the bridge input and output signals will vary from 0 to 180 degrees as the resistance of the resistor 110 is varied from zero to infinity. This relationship is illustrated graphically in Fig. 5.

Figure 5:
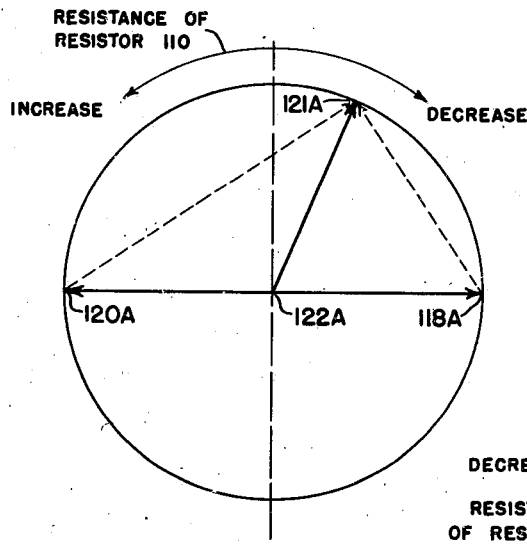
Fig. 5 is a vector diagram illustrating the operation of the apparatus of Fig. 4.

In Fig. 5, the ends of the various voltage vectors are designated by numerals which are the same as those used to designate the corresponding terminals of Fig. 4 between which the particular voltage being represented appears. In Fig. 5, however, the letter "A" is added to such numerals in order to distinguish the vector ends from the corresponding terminals. Thus, the vector 122A—118A represents the portion of the bridge input signal voltage, applied between the bridge input terminals 118 and 120, which appears across the bridge resistor 114, between the terminals 122 and 118. The vector 122A—120A represents the portion of the bridge input voltage which appears across the bridge resistor 116, between the terminals 122 and 120. The voltages 122A—118A and 122A—120A are made equal by a suitable choice of bridge circuit component values, and are 180 degrees out of phase due to the fact that whenever the terminal 118 is positive with respect to the terminal 122, the terminal 120 is negative with respect to the terminal 122.

The vector 118—121A represents the voltage which appears across the variable resistor 110, between the terminals 118 and 121. The vector 120A—121A represents the voltage which appears across the condenser 113, between the terminals 120 and 121, and the vector 122A—121A represents the bridge output voltage which appears across the resistor 117, between the terminals 122 and 121.

As the resistance value of the resistor 110 is varied in accordance with variations in the value of the measured quantity, the resistor voltage vector 118A—121A will vary in length correspondingly. Consequently, the output voltage vector 122A—121A will be rotated about the point 122A, the point 121A following the path of a circle the center of which is the point 122A. The angle which the output voltage vector 122A—121A forms with the supply voltage vector 122A—118A is the phase angle between the bridge input and output voltages. Hence it is easily seen that this phase angle varies from zero, corresponding to a zero resistance value of the resistor 110 and a zero value for the resistor voltage vector 118A—121A, to 180 degrees, corresponding to infinite resistance of the resistor 110 and a maximum value for the resistor voltage vector 118A—121A.

Since the above described phase shift of the bridge input and output voltages is produced on signals having a frequency of 30 cycles per second, the range of this phase shift from 0 to 180 degrees produces a phase shift range from 0 to 360 degrees between the 60 cycle input and output signals of the phase shifter 9. Consequently, as the measuring device, not shown, causes the resistor 110 to vary in resistance from zero to infinity, the phase shifter output signal across the resistor 85 varies in phase from 0 to 360 degrees with respect to the alternating current supply voltage. Such a phase shift range is necessary to produce the desirable 360 degree scale length for the luminous indicating pointer line.

The bridge resistor 111 is made adjustable so that the bridge 106 can be adjusted to produce the desired output signal. It is to be noted that the output voltage of the bridge inherently remains constant as its phase angle relative to the input voltage is varied.

Figure 6:
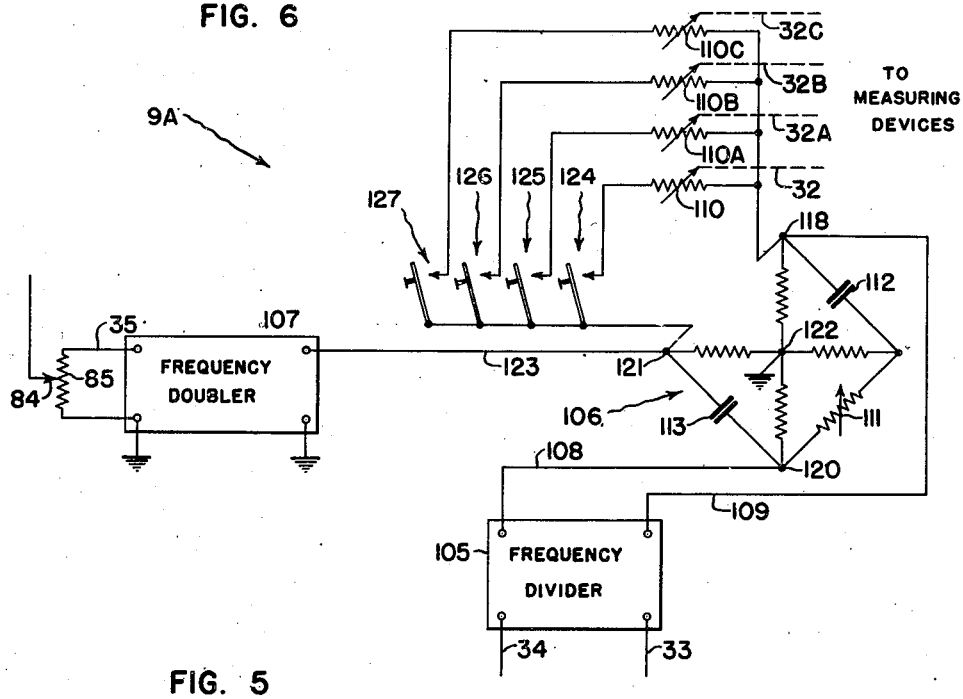

There is illustrated in Fig. 6 the circuit diagram of another form which the condition-sensitive phase shifter 9 of Figs. 1 and 3 may take. The phase shifter 9A of Fig. 6 is similar to that of Fig. 4 but is adapted to permit the indication of the values of a plurality of different measured conditions by a single system as illustrated in Figs. 1 and 3. To this end, the apparatus of Fig. 6 includes all of the components of the Fig. 4 apparatus, and in addition, employs a plurality of variable resistors, similar to the resistor 110, and a selector mechanism by means of which the values of the different measured conditions are selectively indicated.

Although the apparatus of Fig. 6 would be capable of providing output signals corresponding to any desired number of measured quantities, for purposes of simplicity the number of such quantities has been limited to four in the present disclosure. Thus the apparatus of Fig. 6 includes variable resistors 110, 110A, 110B, and 110C, each of which is adjusted by one of the linkages 32, 32A, 32B, and 32C, respectively, in accordance with the value of a respective one of the quantities being measured. The selector switch mechanism of Fig. 6 is shown as comprising four manually operable, momentary contact, single pole-single throw push-button switches 124, 125, 126, and 127. It is to be noted, however, that the selector switch mechanism could comprise a motor driven switch which would operate to cause an indication to be given by the associated apparatus of Figs. 1 and 3 of each of the measured conditions in a predetermined sequence and at a suitable rate.

In the apparatus of Fig. 6, the resistor 110 is connected between the terminals 118 and 121 of the bridge 106 in series with the switch 124, the resistor 110A is connected between these terminals in series with the switch 125, the resistor 110B is connected between these terminals in series with the switch 126, and the resistor 110C is connected between these terminals in series with the switch 127. Thus when the switch 124 is held closed, the resistor 110 only is connected into the bridge 106 between the terminals 118 and 121, and therefore the output signal of the phase shifter 9A is representative only of the value of one of the measured conditions as transmitted to the resistor 110 through the linkage 32. Similarly when any of the other switches 125, 126, and 127 is held closed, the associated one of the resistors 110A, 110B, and 110C is connected into the bridge 106, and an indication is provided by the associated apparatus of Figs. 1 and 3 of the instantaneous values of the particular measured condition associated with the then closed switch.

There is illustrated in Fig. 7 the circuit diagram of another form which the condition-sensitive phase shifter 9 of Figs. 1 and 3 may take. The phase shifter 9B of Fig. 7 is similar to that of Figs. 4 and 6 but is adapted to permit the simultaneous indication by a single system as illustrated in Figs. 1 and 3, of the instantaneous values of a plurality of quantities being measured. To this end, the phase shifter 9B of Fig. 7 comprises a separate bridge circuit, similar to the bridge 106 of Figs. 4 and 6, for each measured quantity the value of which is to be indicated.

Each of these bridges includes a variable resistor which is continuously adjusted in accordance with the values of a respective one of the measured quantities. The bridges are so adjusted relative to one another that a separate luminous pointer line is produced on the screen 21 of the associated system of Figs. 1 and 3 simultaneously for each of the measured quantities, each of these pointer lines being restricted on the screen to a specific portion or area of the latter which is associated with only a particular one of the measured quantities. While this apparatus may be used to indicate the values of as many variables as is found practical, for purposes of illustration the present disclosure is directed towards apparatus which is operative to indicate simultaneously the values of four measured quantities.

The apparatus of Fig. 7 includes the bridge 106 and also includes bridges 128, 129, and 130, these latter being identical to the bridge 106. The bridge 128 comprises variable resistors 131 and 132, condensers 133 and 134, and fixed resistors 135, 136, 137, and 138. The resistor 131 and the condenser 133 are joined at an input terminal 139, the condenser 133 and the resistor 132 are joined at a terminal 140, the resistor 132 and the condenser 134 are joined at an input terminal 141, and the condenser 134 and the resistor 131 are joined at an output terminal 142. The resistors 135, 136, 137, and 138 are respectively connected between the terminals 139, 140, 141, and 142, and a grounded output terminal 143.

The bridge 129 comprises variable resistors 144 and 145, condensers 146 and 147, and fixed resistors 148, 149, 150, and 151. The resistor 144 and the condenser 146 are joined at an input terminal 152, the condenser 146 and the resistor 145 are joined at an output terminal 153, the resistor 145 and the condenser 147 are joined at an input terminal 154, and the condenser 147 and the resistor 144 are joined at a terminal 155. The resistors 148, 149, 150, and 151 are respectively connected between the terminals 152, 153, 154, and 155, and a grounded output terminal 156.

The bridge 130 comprises variable resistors 157 and 158, condensers 159 and 160, and fixed resistors 161, 162, 163, and 164. The resistor 157 and the condenser 159 are joined at an input terminal 165, the condenser 159 and the resistor 158 are joined at an output terminal 166, the resistor 158 and the condenser 160 are joined at an input terminal 167, and the condenser 160 and the resistor 157 are joined at a terminal 168. The resistors 161, 162, 163, and 164 are respectively connected between the terminals 165, 166, 167, and 168, and a grounded output terminal 169.

The apparatus of Fig. 7 also includes an isolation transformer 170, having a primary winding 171 and a secondary winding 172, and a rotary switching mechanism 173. The latter comprises two identical sections 174 and 175, the section 174 being utilized as an output signal selector switch, and the section 175 being utilized as a supply voltage selector switch. The section 174 comprises a movable contact member 176 and associated stationary contact segments 177, 178, 179, and 180. The section 175 comprises a movable contact member 181 and associated stationary contact segments 182, 183, 184, and 185. The movable contacts 176 and 181 are mechanically coupled together and driven in synchronism through a mechanical linkage 186, which in turn is driven at a constant speed by a suitable motor, not shown. The movable contacts 176 and 181 are so positioned by the linkage 186 that the contacts 177, 178, 179, and 180 are engaged in sequence by the contact 176 at the same time that the contacts 182, 183, 184, and 185 are engaged in sequence by the contact 181.

As before, the variable resistor 110 of the bridge 106 is varied through the linkage 32 in accordance with the values of the first measured quantity. In like manner, the variable resistors 131, 145, and 158 of the bridges 128, 129, and 130, respectively, are adjusted through the respective linkages 32A, 32B, and 32C in accordance with the values of the second, third, and fourth measured quantities, respectively. It is to be noted that the adjusted resistors 145 and 158 of the respective bridges 129 and 130 are located in the lower right-hand arms of these bridges, while the adjusted resistors 110 and 131 of the respective bridges 106 and 128 are located in the upper left-hand arms of the latter bridges. This is done so that the various luminous pointer lines can be given their correct relative positions on the cathode ray tube screen, as will hereinafter be described.

The primary winding 171 of the transformer 170 is connected between the branch supply conductors 33 and 34. One terminal of the secondary winding 172 is connected by a conductor 187 to the bridge input terminals 118, 139, 152, and 165. The other terminal of the winding 172 is connected by a conductor 188 to the movable contach 181 of the switch section 175. The contact 182 of this section is connected by a conductor 189 to the bridge input terminal 120, the contact 183 is connected by a conductor 190 to the bridge input terminal 141, the contact 184 is connected by a conductor 191 to the bridge input terminal 154, and the contact 185 is connected by a conductor 192 to the bridge input terminal 167. Thus as the movable contact 181 engages its associated stationary contacts one after another, the bridges 106, 128, 129, and 130 are momentarily energized in sequence.

The grounded bridge output terminals 122, 143, 156, and 169 are all connected to the grounded output conductor of the phase shifter 9B through the common ground connection. The other output conductor 35 is connected to the movable contact 176 of the switch section 174. The contact 177 of the latter is connected by a conductor 193 to the bridge output terminal 121, the contact 178 is connected by a conductor 194 to the bridge output terminal 142, the contact 179 is connected by a conductor 195 to the bridge output terminal 153, and the contact 180 is connected by a conductor 196 to the bridge output terminal 166. Thus as each of the bridges 106, 128, 129, and 130 is energized in turn by the switch section 175, the output of the particular bridge which is then energized is connected by the switch section 174 between the output conductors of the phase shifter 9B.

In Fig. 8 there are illustrated typical luminous pointer lines on the screen of the tube 1 of the apparatus of Figs. 1 and 3 when the condition-sensitive phase shifter 9B of Fig. 7 is utilized in this apparatus. This diagram of Fig. 8 is similar to that of Fig. 2 in which a single pointer line, as obtained with the phase shifters of Figs. 4 and 6, is illustrated.

When the apparatus of Figs. 1 and 3 includes the phase shifter 9B of Fig. 7, the screen 21 of the cathode ray tube 1 is advantageously divided into four quadrants by axes as shown in Fig. 8. These four quadrants are designated 197, 198, 199, and 200 in Fig. 9, and each is associated with a different one of the four measured quantities. A luminous pointer line is produced in each of these quadrants on the screen 21, each pointer being restricted in its movement to its particular quadrant. Thus, for example, a pointer 201—202 may be produced in the quadrant 197 in accordance with the signal from the bridge 106, which in turn is controlled by the value of the first measured condition, and pointers 203—202, 204—202, and 205—202 will then be produced in the respective quadrants 198, 199, and 200 in accordance with the signals from the bridges 128, 129, and 130, respectively, which in turn are respectively controlled by the second, third, and fourth measured conditions. Consequently, as the value of the first measured quantity varies through its measurable range, the pointer 201—202 in the quadrant 197 will move from one of the axis boundaries to the other. Similarly, as each of the other measured quantities varies through its measurable range, its associated pointer will move in its respective quadrant from one axis boundry to the other.

As was mentioned hereinbefore, the pulse generator 7 of Figs. 1 and 3 is operative to produce a pulse, which causes the appearance of a luminous pointer line on the screen 21, once during each cycle of the alternating current supply. Consequently, when the phase shifter 9B of Fig. 7 is employed, only one of the pointer lines of Fig. 8 can be produced in any one cycle of the supply voltage. In order to have all four of the pointer lines appear on the screen simultaneously, it is necessary to have them produced as frequently as possible, which is once every four cycles of the supply voltage. To accomplish this, the switch mechanism 173 must be driven so that the movable contacts 176 and 181 make one complete revolution every four cycles. Under these conditions, the pointer 201—202 in the quadrant 197 will be produced during a given cycle, the pointer 203—202 in the quadrant 198 will be produced during the next cycle, the pointer 204—202 in the quadrant 199 will be produced during the third cycle, and the pointer 205—202 in the quadrant 200 will be produced during the fourth cycle, after which the pointer in the quadrant 197 will again be produced and the operating cycle repeated.

Although in the operating cycle just described any one pointer line is produced only once every four cycles of the supply voltage, yet due to the persistence of the fluorescent screen 21 and the persistence of vision, all four pointers will appear on the screen simultaneously.

To explain further the operation of the apparatus embodying the phase shifter 9B of Fig. 7, it is assumed that the operating cycle starts at point 206 in Fig. 8. The light dashed lines of Fig. 8 represent as before the path over which the electron beam in the tube 1 would produce a luminous trace if this tube were conductive at all times. At the start of the operating cycle, this path begins at point 206, and continues through points 201, 202, and 207, and back to point 206, completing the first cycle of the supply voltage. The pointer line 201—202 is thus produced during this first supply voltage cycle. As the path continues from point 206 during the second cycle, it passes through points 203, 202, and 208, returning to point 206 at the end of this cycle. The pointer line 203—202 is thus produced during the second supply voltage cycle.

In a similar manner, the path continues during the third and fourth supply voltage cycles, passing from point 206 through points 204, 202, 209, 206, 205, 202, and 210, producing the pointer lines 204—202 and 205—202, and returning to point 206 at the end of the fourth supply voltage cycle. This is also the end of the described operating cycle, and the latter is then repeated substantially as described.

The manner in which the various pointer lines of the apparatus just considered are restricted to movement within their related quadrants will now be described. Although the bridge 106 of Fig. 7 operates according to the diagram of Fig. 5 as previously described, it is to be noted that, in Fig. 7, no frequency changing means is provided. Consequently, when the output of the bridge 106 is connected to the output of the phase shifter 9B, the phase shifter output voltage can vary in phase only through 180 degrees, as shown in Fig. 5. In the Fig. 7 apparatus, however, the maximum resistance which the linkage 32 can cause the resistor 110 to have is limited to the value which makes the output voltage 122A—121A 90 degrees out of phase with the supply voltage. Consequently, the pointer line 201—202, produced by the output signal of the bridge 106, can only appear in the quadrant 197.

The minimum value which the resistor 131 of the bridge 128 can be given by the linkage 32A is limited to that which makes the output voltage of this bridge 90 degrees out of phase with the supply voltage. Consequently, the pointer line 203—202, produced by the output signal of the bridge 128, can only appear in the quadrant 198. The maximum limit of the resistance value of the resistor 110 is seen, therefore, to be the minimum limit of the resistance value of the resistor 131. The resistors 111 and 132 serve as calibrating resistors in the usual manner.

Figure 9:
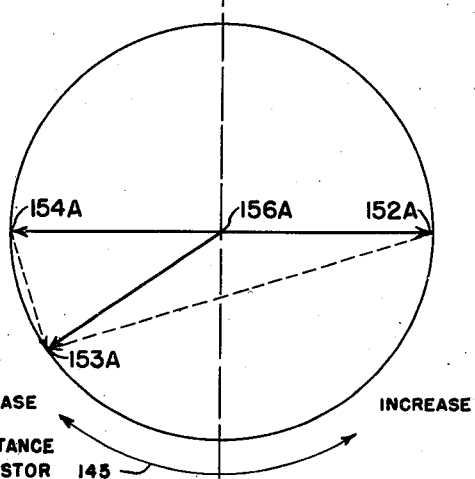
Fig. 9 is a vector diagram illustrating the operation of the apparatus of Fig. 7.

The bridge 129, which produces the pointer line 204—202 in the quadrant 199, is connected in such a manner that the output voltage varies in phase with respect to the supply voltage as shown by the vector diagram of Fig. 9. In this figure, the vector 156A—154A represents the input voltage developed across the resistor 150, and the vector 156A—152A represents the input voltage across the resistor 148. The vector 154A—153A represents the voltage across the resistor 145, which is the resistor that is varied by the linkage 32B in accordance with the associated measured condition, the vector 152A—153A represents the voltage across the condenser 146, and the vector 156A—153A represents the bridge output voltage appearing across the resistor 149.

From Fig. 9 it can be seen that the output voltage 156A—153A of the bridge 129 can be shifted in phase through 180 degrees relative to the supply voltage. By limiting the maximum value which the linkage 32B can give to the resistor 145, the phase angle through which the output voltage 156A—153A can vary relative to the supply voltage will be limited. Consequently, the maximum value of the resistor 145 is limited to that which makes the output voltage 156A—153A 90 degrees out of phase with the supply voltage or 270 degrees ahead in phase with respect to the latter. Therefore, the pointer line 204—202, produced by the output signal of the bridge 129, can only appear in the quadrant 199. Similarly, the minimum resistance value of the adjusted resistor 158 of the bridge 130, which bridge is identical to the bridge 129, is limited to the value which causes the output voltage of the latter to lead the supply voltage by 270 degrees. Consequently, the pointer line 205—202, produced by the output signal of the bridge 130, can only appear in the quadrant 200. The maximum limit of the resistance value of the resistor 145 is seen, therefore, to be the minimum limit of the resistance value of the resistor 158. The resistors 144 and 157 serve as calibrating resistors in the usual manner.

There is illustrated in Fig. 10 the circuit diagram of still another form which the condition-sensitive phase shifter 9 of Figs. 1 and 3 may take. The phase shifter 9C of Fig. 10 is similar to that of Fig. 7 in that it permits the simultaneous indication, by a single system as illustrated in Figs. 1 and 3, of the instantaneous values of a plurality of quantities being measured. However, instead of the various luminous pointer lines being limited to specific areas of the cathode ray tube screen, the apparatus of Fig. 10 produces a plurality of pointer lines each of which has a different, predetermined, constant length. The length of any pointer line is, therefore, indicative of the one of the various measured quantities with which the particular pointer line is associated. Since the various pointer lines are thus distinguishable from each other by their different lengths, each of the pointer lines can have a full scale deflection of approximately 360 degrees, as do the pointer lines produced by the phase shifters of Figs. 4 and 6. Consequently, the phase shifter of Fig. 10 is superior to the other previously described herein in that it permits both simultaneous multiple indication and long scale length to be had. For purposes of explanation, the apparatus of Fig. 10 is shown as being operative to produce output signals in accordance with the measured values of four different quantities. It is to be understood, however, that apparatus of the type shown in Fig. 10 can be made which will permit the simultaneous indication of the values of any practical number of different measured quantities.

The phase shifter 9C of Fig. 10 includes the bridge 106 of Fig. 4, the adjusted bridge resistors 110, 110A, 110B, and 110C and their associated adjusting linkages 32, 32A, 32B, and 32C of Fig. 6, the frequency divider 105 and the frequency doubler 107 of Fig. 4, the rotary switching mechanism 173 of Fig. 7, and a tapped-primary transformer 211. The transformer 211 is operative, under the control of the section 174 of the switching mechanism 173, to vary the input voltage supplied to the beam deflecting phase shifter of Figs. 1 and 3 through the transformer 42. Such input voltage control is utilized to produce the desired different lengths of the different luminous pointer lines.

The transformer 211 comprises a tapped, line voltage winding 212 and a secondary winding 213. The winding 212 is provided with end terminals 214 and 215, and with taps 216, 217, and 218 adjacent the terminal 215. The latter is connected by a conductor 219 to the stationary contact 177 of the switch section 174, and the movable contact 176 of the latter is connected by a conductor 220 to the branch supply conductor 33. The other branch supply conductor 34 is connected by a conductor 221 to the terminal 214 of the winding 212. The tap 216 on the winding 212 is connected by a conductor 222 to the switch contact 178, the tap 217 is connected by a conductor 223 to the contact 179, and the tap 218 is connected by a conductor 224 to the contact 180. When the full winding 212 is energized, the voltage ratio of this winding to the winding 213 is 1:1.

The secondary winding 213 is connected by conductors 225 and 226 to the input of the beam deflecting phase shifter 2 of Figs. 1 and 3, not shown in Fig. 10. The conductors 225 and 226 replace the connection of the supply conductors 22 and 23 to the phase shifter 2, as shown in Figs. 1 and 3. Through the connections just described, the beam deflecting phase shifter 2 is supplied with input voltage from the transformer 211 and the supply conductors 22 and 23, which voltage is varied as the movable switch contact 176 is moved relative to the contacts 177, 178, 179, and 180. When the movable contact 176 is in engagement with the contact 177, the full supply voltage of the conductors 22 and 23 is supplied to the phase shifter 2, causing the latter to be fully energized as it is at all times when the previously desccribed condition-sensitive phase shifters are employed. When the movable contact 176 is in engagement with the contact 178, only the portion of the winding 212 between the terminal 214 and the tap 216 is energized, and consequently the beam deflecting phase shifter 2 is supplied with a lower value of energizing voltage. Similarly, when the contact 176 engages the contacts 179 or 180, the phase shifter 2 is supplied with a lower value, or a still lower value, respectively, of energizing voltage.

The input of the frequency divider 105 is connected as before across the supply conductors 33 and 34. The output of the divider 105 is connected as before to the input terminals 118 and 120 of the bridge 106. The grounded output terminal 122 of the latter is connected through the common ground connection to the grounded input terminal of the frequency doubler 107, and the bridge output terminal 121 is connected to the other input terminal of the doubler 107. The output of the latter is connected across the resistor 85 as before.

The movable contact 181 of the switch section 175 is connected by a conductor 227 to the bridge terminal 121, and one end terminal of each of the resistors 110, 110A, 110B, and 110C is connected to the bridge terminal 118 by a conductor 228. The other end of the resistor 110 is connected by a conductor 229 to the switch contact 182, and the other ends of the resistors 110A, 110B, and 110C are respectively connected to the contacts 183, 184, and 185 by conductors 230, 231, and 232, respectively.

When the movable contact 181 is in engagement with the contact 182, the resistor 110 is connected in the arm of the bridge 106 between the terminals 118 and 121, and the phase of the output signal of the phase shifter 9C is then dependent on the value of the first measured condition, which is associated with the linkage 32. At this same time, the movable contact 176 of the switch section 174 is in engagement with the contact 177, and the full supply voltage is applied to the input of the beam deflecting phase shifter 2.

In Fig. 11 there are illustrated typical luminous pointer lines on the screen of the tube 1 of the apparatus of Figs. 1 and 3 when the condition-sensitive phase shifter 9C of Fig. 10 is utilized in this apparatus. This diagram of Fig. 11 is similar to that of Figs. 2 and 8, which show typical pointer lines for the other disclosed forms of the condition-sensitive phase shifter. In Fig. 11, a typical lumious pointer line, produced in accordance with the instantaneous values of the first measured condition, is shown by the line 233—234. Such a line is produced when the switch contacts 176 and 177, and 181 and 182 are in respective engagement.

The movable switch contacts 176 and 181 are driven in synchronism through the linkage 186 as they were in the phase shifter 9B of Fig. 7. Also as in the phase shifter 9B, the contacts 176 and 181 of Fig. 10 are advantageously given a complete revolution once every four cycles of the supply voltage, for the reasons previously given in connection with Fig. 7.

As the switch contact 181 is moved from engagement with the contact 182 and into engagement with the contact 183, the resistor 110 is replaced by the resistor 110A in the arm of the bridge 106. Consequently, the output signal of the phase shifter 9C is then dependent in phase on the value of the second measured condition. At this same time, the movable contact 176 is moved from engagement with the contact 177 and into engagement with the contact 178. Hence, the pointer line produced in accordance with the instantaneous values of the second measured condition will be shorter than that associated with the first measured condition, since the magnitude of the voltage supplied to the beam deflecting phase shifter 2 has been reduced. Such a luminous pointer line, associated with the second measured condition, is shown by the line 235—234 of Fig. 11.

As the switch contacts 176 and 181 continue to rotate, luminous pointer lines of the third and fourth measured conditions are produced in order. Since the input voltage to the beam deflecting phase shifter 2 is progressively decreased as these latter pointer lines are produced, the pointer line associated with the third measured condition will be shorter than the previous two, as shown by the line 236—234, and the pointer line associated with the fourth measured condition will be still shorter, as shown by the line 237—234.

Since the phase shifter 9C includes frequency dividing and doubling means, each of the pointer lines of Fig. 11 can be moved through approximately 360 degrees of arc, as previously mentioned. All four of the pointer lines are visible simultaneously as for the apparatus of Fig. 7. Due to the control of the beam deflecting phase shifter input voltage exercised by the phase shifter 9C, however, the outer extremity of the pointer line 233—234 will always lie on the circle 238, and the outer extremities of the pointer lines 235—234, 236—234, and 237—234 will always lie on their respective circles 239, 240, and 241. If desired, each of these concentric circles can be marked with appropriate divisions corresponding to the particular associated measured condition.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In combination, a normally non-conductive cathode ray tube operative when conductive to produce an electron beam, beam deflecting means adapted to be connected to a source of alternating voltage and to be normally made operative to deflect said beam from the axis of said tube and to rotate it about said axis at a frequency corresponding to the frequency of the alternating voltage supplied by said source, control means responsive to a controlling condition of variable value and having an output circuit in which a voltage appears which is modified in accordance with the value of said controlling condition, means controlled by the output voltage of said control means and including a pulse generator responsive to said output voltage and having an output circuit in which a voltage pulse appears once during each cycle of alternation of the first mentioned voltage, differentiating means operative to cause said pulse to make said tube conductive during a portion of the corresponding cycle of alternation of said first mentioned voltage, and means operative to cause said pulse to make said beam deflecting means inoperative during the intervals in which said tube is made conductive, each of said portions being dependent for its position in the corresponding cycle of alternation of said first mentioned voltage on the instantaneous value of said condition.

2. The combination with a cathode ray tube having a plurality of beam deflecting elements and normally maintained non-conductive, of means for causing said tube to produce an electron beam when conductive, deflecting means adapted to energize said elements cyclically to deflect said beam according to a predetermined pattern, said deflecting means including a separate electronic amplifier for each of said deflecting elements, each of said amplifiers having an input circuit and an output circuit, means for impressing a cyclically varying voltage on the input circuit of each of said amplifiers of the same frequency but displaced in phase from the cyclically varying voltage impressed on each of the other amplifier input circuits, a connection between the output circuit of each of said amplifiers and a corresponding one of said deflecting elements, means responsive to a controlling condition of variable value for making said cathode ray tube conductive for an interval during each cycle of said pattern, and means for intermittently impressing potentials on said amplifier input circuits to render said amplifiers non-conductive during the intervals in which said tube is made conductive, each of said intervals being dependent for its position in the corresponding cycle of said pattern on the instantaneous value of said condition.

3. The combination with a cathode ray tube having a plurality of beam deflecting elements and a control electrode and adapted to produce an electron beam when conductive, of means for normally biasing said control electrode so that said tube is normally maintained non-conductive, deflecting means for normally energizing said deflecting elements to deflect said electron beam in accordance with a predetermined pattern, said deflecting means including a separate amplifier for each of said deflecting elements having an output circuit connected to the corresponding deflecting element and having an input circuit, means for impressing cyclically varying voltages of the same frequency but displaced in phase from one another on the different input circuits of said amplifiers, means responsive to the instantaneous value of a controlling condition of variable value for periodically creating a voltage pulse during each period in which said predetermined pattern is cyclically repeated, and means for utilizing said pulses to render said tube temporarily conductive and immediately thereafter to render said amplifiers temporarily non-conductive.

4. In combination, a normally non-conductive cathode ray tube having a plurality of beam deflecting elements and operative when conductive to produce an electron beam, beam deflecting means adapted to be connected to a source of alternating voltage and to be normally made operative to deflect said beam from the axis of said tube and to rotate it about said axis at a frequency corresponding to the frequency of the alternating voltage supplied by said source, said deflecting means including a phase shifting bridge circuit having an input circuit adapted to be energized by said alternating voltage and having a plurality of output circuits, a connection between each of said output circuits and a corresponding one of said deflecting elements whereby a cyclically varying voltage is normally impressed on each of said elements having the frequency of the first mentioned voltage and being displaced in phase from the voltage impressed on each of the other elements, and means responsive to a controlling condition of variable value and operative to make said tube conductive and to make said beam deflecting means inoperative immediately thereafter during a portion of a cycle of alternation of said first mentioned voltage, said portion being dependent for its position in said cycle on the instantaneous value of said condition.

5. In combination, a normally non-conductive cathode ray tube having a plurality of beam deflecting electrodes and a control electrode and operative when conductive to produce an electron beam, beam deflecting means adapted to be connected to a source of alternating voltage and to be normally made operative to deflect said beam from the axis of said tube and to rotate it about said axis at a frequency corresponding to the frequency of the alternating voltage supplied by said source, said deflecting means including a separate electronic amplifier for each of said deflecting elements, each of said amplifiers having an input circuit and an output circuit, energizing means for normally impressing an alternating voltage on the input circuit of each of said amplifiers of the same frequency as the first mentioned voltage but displaced in phase from the alternating voltage impressed on each of the other amplifier input circuits, said energizing means including a phase shifting bridge circuit having an input circuit adapted to be energized by said first mentioned alternating voltage and having a plurality of output circuits, a connection between each of said output circuits and a corresponding one of the input circuits of said amplifiers, a condition-sensitive phase shifter having an input circuit adapted for connection to a source of alternating voltage of said frequency and having an output circuit in which an alternating voltage of said frequency is maintained, said phase shifter including means responsive to a controlling condition of variable value for varying the phase of the voltage in said output circuit relative to the phase of said first mentioned voltage, control means controlled by the output voltage of said phase shifter and including a pulse generator responsive to said last mentioned output voltage and having an output circuit in which a voltage pulse appears once during each cycle of alternation of said first mentioned voltage, differentiating means connected between said control means and said control electrode of said tube and operative to cause each of said pulses to render said tube conductive for an interval during the corresponding cycle of said first mentioned voltage, and a connection between said control means and said phase shifting bridge circuit whereby each of said pulses is operative to render said amplifiers non-conductive during the intervals in which said tube is rendered conductive, each of said intervals being dependent for its position in the corresponding cycle of said first mentioned voltage on the instantaneous phase relationship between the latter and the output voltage of said condition-sensitive phase shifter.

6. The combination with a cathode ray tube having a plurality of beam deflecting elements and normally maintained non-conductive, of means for causing said tube to produce an electron beam when conductive, deflecting means for energizing said deflecting elements with voltages of a predetermined frequency and relative phase relationship and adapted normally to produce a deflection of said beam in accordance with a predetermined pattern, means for generating negative voltage pulses operative to render inoperative said deflecting means, means for controlling the occurrence of said pulses in accordance with the instantaneous value of a controlling condition of variable value, means for deriving from said pulses second pulses substantially coincident with one of the edges of said first mentioned pulses and of substantially shorter duration than said first mentioned pulses, and means for utilizing said second pulses to render said cathode ray tube temporarily conductive immediately before said deflecting means is rendered inoperative.

7. The combination with a cathode ray tube having a plurality of beam deflecting elements and normally maintained non-conductive, of means for causing said tube to produce an electron beam when conductive, deflecting means for energizing said deflecting elements with voltages of a predetermined frequency and relative phase relationship and adapted normally to produce a deflection of said beam in accordance with a predetermined pattern which is cyclically repeated, means for generating a negative voltage pulse during each cycle of repetition of said pattern, said pulse being operative to render inoperative said deflecting means, means for controlling the time of occurrence of said pulses in their respective cycles in accordance with the instantaneous values of a controlling condition of variable value, means for deriving from said pulses second pulses substantially coincident with one of the edges of said first mentioned pulses and of substantially shorter duration than said first mentioned pulses, and means for utilizing said second pulses to render said cathode ray tube temporarily conductive immediately before said deflecting means is rendered inoperative.

8. The combination with a cathode ray tube having a plurality of beam deflecting elements and a control electrode, of means for normally applying a negative bias voltage to said control electrode whereby said tube is normally maintained non-conductive, means for causing said tube to produce an electron beam when conductive, deflecting means for energizing said deflecting elements with voltages of a predetermined frequency and relative phase relationship and adapted normally to produce a deflection of said beam in accordance with a predetermined pattern, pulse generating means for generating negative voltage pulses operative to render inoperative said deflecting means, said pulse generating means having an output circuit in which said pulses appear, control means for controlling the occurrence of said pulses in accordance with the instantaneous value of a controlling condition of variable value, differentiating means for deriving from said pulses second pulses substantially coincident with the leading edges of said first mentioned pulses and of substantially shorter duration than said first mentioned pulses, said differentiating means comprising an electron discharge device having a plate, a cathode, and a control grid, a condenser connected between the output circuit of said pulse generating means and said control grid, a second condenser connected between said plate and said control electrode, means for normally maintaining said plate at a predetermined positive potential relative to said cathode, and means for causing the appearance of a negative voltage pulse in said output circuit to produce a sudden increase in the potential difference between said plate and said cathode, whereby a positive pulse is applied to said control electrode to render said tube momentarily conductive.

9. In combination, a normally non-conductive cathode ray tube operative when conductive to produce an electron beam, beam deflecting means adapted to be connected to a source of alternating voltage and to be normally made operative to deflect said beam from the axis of said tube and to rotate it about said axis at a frequency corresponding to the frequency of the alternating voltage supplied by said course, a condition-sensitive phase shifter having an input circuit adapted for connection to a source of alternating voltage of said frequency and having an output circuit in which an alternating voltage of said frequency is maintained, said phase shifter including means responsive to a controlling condition of variable value for varying the phase of the voltage in said output circuit relative to the phase of the first mentioned voltage in accordance with the value of said condition, and control means through which said phase shifter makes said tube conductive and makes said beam deflecting means inoperative immediately thereafter during a portion of a cycle of alternation of said first mentioned voltage, said portion being dependent for its position in said cycle on the instantaneous phase relationship between the voltage in said output circuit and said first mentioned voltage.

10. Apparatus as specified in claim 9 wherein said condition-sensitive phase shifter includes a phase shifting bridge circuit having an input circuit adapted to be connected to the second mentioned source of alternating voltage, having an adjustable impedance in one arm, and having an output circuit connected to said control means, and means connected to said adjustable impedance and operative to adjust the value of the latter in accordance with the value of said condition, the phase relationship between the voltage applied to said control means and the voltage of said second mentioned source being varied through a given angle as the value of said adjustable impedance is varied an amount corresponding to a given change in the value of said condition.

11. Apparatus as specified in claim 9 wherein said condition-sensitive phase shifter includes a phase shifting bridge circuit having an input circuit adapted to be connected to the second mentioned source of alternating voltage, having an adjustable impedance in one arm, and having an output circuit connected to said control means, means connected to said adjustable impedance and operative to adjust the value of the latter in accordance with the value of said condition, and means connected between said second mentioned source of voltage and said bridge circuit, and between the latter and said control means, and operative to cause phase relationship between the voltage applied to said control means and the voltage of said second mentioned source to vary through a given angle as the value of said adjustable impedance is varied, by a change in the value of said condition through a corresponding range, to cause the phase relationship between the input circuit voltage and output circuit voltage of said bridge to vary through one half of said angle.

12. Apparatus as specified in claim 9 wherein said condition sensitive phase shifter comprises a phase shifting bridge circuit having an input circuit and an output circuit and an adjustable impedance in one arm, frequency dividing means having an input circuit and an output circuit, frequency doubling means having an input circuit and an output circuit, conductors connecting the input circuit of said frequency dividing means to the second mentioned source of alternating voltage of said frequency, conductors connecting the output circuit of said frequency dividing means to the input circuit of said bridge, whereby an alternating voltage of one half of said frequency is applied to said bridge, means connected to said adjustable impedance and operative to adjust the value of the latter in accordance with the value of said condition, conductors connecting the output circuit of said bridge to the input circuit of said frequency doubling means, whereby there is applied to said frequency doubling means an alternating voltage of said one-half frequency which differs in phase from the voltage applied to the input circuit of said bridge by an amount dependent upon the value of said adjustable impedance, and conductors connecting the output of said frequency doubling means to said control means.

13. Apparatus as specified in claim 9 wherein said condition-sensitive phase shifter includes a phase shifting bridge circuit having an input circuit and an output circuit and a plurality of bridge arms connected between said last mentioned circuits, an adjustable impedance in one of said bridge arms, means connected to said impedance and operative to adjust the value of the latter in accordance with the value of said condition, and means connecting the input and output circuits of said bridge to the input and output circuits, respectively, of said condition-sensitive phase shifter, whereby changes in the value of said condition produce corresponding changes in the value of said impedance which in turn produce changes in the value of the phase angle between the voltage of the second mentioned source and the voltage in the output circuit of said phase shifter.

14. Apparatus as specified in claim 9 wherein said condition-sensitive phase shifter includes a phase shifting bridge circuit having an input circuit and an output circuit and a plurality of bridge arms connected between said last mentioned circuits, an adjustable impedance in one of said bridge arms, means connected to said impedance and operative to adjust the value of the latter in accordance with the value of said condition, whereby changes in the value of said condition produce corresponding changes in the value of said impedance which in turn produce changes in the value of the phase angle between the respective voltages of the input and output circuits of said bridge, and means connecting the input and output circuits of said bridge to the input and output circuits, respectively, of said condition-sensitive phase shifter and operative to produce changes in the value of the phase angle between the voltage of the second mentioned source and the voltage in the output circuit of said phase shifter which correspond to the changes in said first mentioned phase angle and said value of said condition but which are twice as large as the corresponding changes in said first mentioned phase angle.

15. In combination, a normally non-conductive cathode ray tube operative when conductive to produce an electron beam, beam deflecting means adapted to be connected to a source of alternating voltage and to be normally made operative to deflect said beam from the axis of said tube and to rotate it about said axis at a frequency corresponding to the frequency of the alternating voltage supplied by said source, and means responsive to a plurality of controlling conditions of variable value and operative to make said tube conductive and to make said beam deflecting means inoperative immediately thereafter during a portion of each cycle of alternation of said voltage, said portion being dependent for its position in one of said cycles on the instantaneous value of a corresponding one of said conditions and being dependent for its positions in others of said cycles on the corresponding instantaneous values of others of said condition.

16. In combination, a normally non-conductive cathode ray tube operative when conductive to produce an electron beam, beam deflecting means adapted to be connected to a source of alternating voltage and to be normally made operative to deflect said beam from the axis of said tube and to rotate it about said axis at a frequency corresponding to the frequency of the alternating voltage supplied by said source, a condition-sensitive phase shifter having an input circuit adapted for connection to a source of alternating voltage of said frequency and having an output circuit in which an alternating voltage of said frequency is maintained, said phase shifter including a plurality of adjustable means, each of which is responsive to a corresponding one of a plurality of controlling conditions of variable value and operative, one at a time, to vary the phase relationship between the voltage in said output circuit and the first mentioned voltage in accordance with the value of the corresponding one of said conditions, and control means through which said phase shifter makes said tube conductive and makes said deflecting means inoperative immediately thereafter during a portion of each cycle of alternation of said first mentioned voltage, said portion being dependent for its position in one of said cycles on the instantaneous value of a corresponding one of said conditions and being dependent for its position in others of said cycles on the corresponding instantaneous values of others of said conditions.

17. Apparatus as specified in claim 16 wherein said condition-sensitive phase shifter includes a phase shifting bridge circuit having an input circuit adapted to be connected to the second mentioned source of alternating voltage and having an output circuit connected to said control means, a plurality of adjustable impedances, switching means operative to connect said impedances one at a time in one of the arms of said bridge circuit, and separate means connected to each of said adjustable impedances, each operative to adjust the value of the corresponding one of said impedances in accordance with the value of a corresponding one of said conditions, the phase relationship between the voltage applied to said control means and the voltage of said second mentioned source being dependent at any time on the instantaneous value of the particular one of said adjustable impedances which is at that time connected by said switching means into said one bridge arm.

18. Apparatus as specified in claim 16 wherein said condition-sensitive phase shifter includes a phase shifting bridge circuit having an input circuit adapted to be connected to the second mentioned source of alternating voltage and having an output circuit connected to said control means, a plurality of adjustable impedances, switching means including a plurality of manually operable contacts operative to connect said impedances one at a time and in any desired sequence in one of the arms of said bridge circuit, and separate means connected to each of said adjustable impedances each operative to adjust the value of the corresponding one of said impedances in accordance with the value of a corresponding one of said conditions, the phase relationship between the voltage applied to said control means and the voltage of said second mentioned source being dependent at any time on the instantaneous value of the particular one of said adjustable impedances which is at that time connected by said switching means into said one bridge arm.

19. In combination, a normally non-conductive cathode ray tube including a fluorescent screen having its center at the axis of said tube, said tube being operative when conductive to produce an electron beam and a resultant luminous spot on said screen, beam deflecting means adapted to be connected to a source of alternating voltage and to be normally made operative to deflect said beam from the axis of said tube and to rotate said luminous spot through a circular path about said axis at a frequency corresponding to the frequency of the alternating voltage supplied by said source, whereby a circular luminous trace tends to be produced on said screen when said tube is conductive, a condition-sensitive phase shifter having an input circuit adapted for connection to a source of alternating voltage of said frequency and having an output circuit in which an alternating voltage of said frequency is maintained, said phase shifter including a plurality of adjustable means, each of which is responsive to a corresponding one of a plurality of controlling conditions of variable value and operative, one at a time, to vary the phase relationship between the voltage in said output circuit and the first mentioned voltage in accordance with the value of the corresponding one of said conditions, and control means through which said phase shifter makes said tube conductive and makes said deflecting means inoperative immediately thereafter during a portion of each cycle of alternation of said first mentioned voltage, said portion being dependent for its position in one of said cycles on the instantaneous value of a corresponding one of said conditions and being dependent for its position in others of said cycles on the corresponding instantaneous values of others of said conditions, whereby a luminous pointer line is produced on said screen extending radially from said circular path to the center of said screen and being angularly positioned around the axis of said tube at any time in accordance with the instantaneous value of the particular one of said adjustable means which is operative at that time to vary said phase relationship in accordance with the value of the corresponding one of said conditions.

20. Apparatus as specified in claim 19 wherein said condition-sensitive phase shifter includes a phase shifting bridge circuit having an input circuit adapted to be connected to the second mentioned source of alternating voltage and having an output circuit connected to said control means, a plurality of adjustable impedances, switching means including a plurality of manually operable contacts operative to connect said impedances, one at a time, and in any desired sequence in one of the arms of said bridge circuit, and separate means connected to each of said adjustable impedances, each operative to adjust the value of the corersponding one of said impedances in accordance with the value of a corresponding one of said conditions, the phase relationship between the voltage applied to said control means and the voltage of said second mentioned source being dependent at any time on the instantaneous value of the particular one of said adjustable impedances which is at that time connected by said switching means into said one bridge arm, said luminous pointer line being angularly positioned on said screen around the axis of said tube at any time in accordance with the instantaneous value of the particular one of said adjustable impedances which is operative at that time to vary said phase relationship in accordance with the value of the corresponding one of said conditions.

21. In combination, a normally non-conductive cathode ray tube including a fluorescent screen having its center at the axis of said tube, said tube being operative when conductive to produce an electron beam and a resultant luminous spot on said screen, beam deflecting means adapted to be connected to a source of alternating voltage and to be normally made operative to deflect said beam from the axis of said tube and to rotate said luminous spot through a circular path about said axis at a frequency corresponding to the frequency of the alternating voltage supplied by said source, whereby a circular luminous trace tends to be produced on said screen when said tube is conductive, and means responsive to a plurality of controlling conditions of variable value and operative to make said tube conductive and to make said beam deflecting means inoperative immediately thereafter during a portion of each cycle of alternation of said voltage, said portion being dependent for its position in one of said cycles on the instantaneous value of a corresponding one of said conditions and being dependent for its positions in others of said cycles on the corresponding instantaneous values of others of said conditions, whereby a luminous pointer line is produced on said screen extending radially from said circular path to the center of said screen and being angularly positioned about the axis of said tube at any one time in accordance with the instantaneous value of one of said conditions.

22. In combination, a normally non-conductive cathode ray tube including a fluorescent screen characterized by its relatively high persistence and having its center at the axis of said tube, said tube being operative when conductive to produce an electron beam and a resultant luminous spot on said screen, beam deflecting means adapted to be connected to a source of alternating voltage and to be normally made operative to deflect said beam from the axis of said tube and to rotate said luminous spot through a circular path about said axis at a frequency corresponding to the frequency of the alternating voltage supplied by said source, whereby a circular luminous trace tends to be produced on said screen when said tube is conductive, and means responsive to a plurality of controlling conditions of variable value and operative to make said tube conductive and to make said beam deflecting means inoperative immediately thereafter during a portion of each cycle of alternation of said voltage, said portion being dependent for its position in one of said cycles on the instantaneous value of a corresponding one of said conditions and being dependent for its positions in others of said cycles on the corresponding instantaneous values of others of said conditions, whereby a plurality of luminous pointer lines is produced simultaneously on said screen, due to the persistence of the latter and to persistence of vision, each of said pointer lines extending radially from said circular path to the center of said screen and being angularly positioned about the axis of said tube in accordance with the instantaneous value of a corresponding one of said conditions, and means operative to characterize each of said pointer lines in a predetermined manner to associate said line with corresponding one only of said conditions.

23. In combination, a normally non-conductive cathode ray tube including a fluorescent screen characterized by its relatively high persistence and having its center at the axis of said tube, said tube being operative when conductive to produce an electron beam and a resultant luminous spot on said screen, beam deflecting means adapted to be connected to a source of alternating voltage and to be normally made operative to deflect said beam from the axis of said tube and to rotate said luminous spot through a circular path about said axis at a frequency corresponding to the frequency of the alternating voltage supplied by said source, whereby a circular luminous trace tends to be produced on said screen when said tube is conductive, a condition-sensitive phase shifter having an input circuit adapted for connection to a source of alternating voltage of said frequency and having an output circuit in which an alternating voltage of said frequency is maintained, said phase shifter including a plurality of adjustable means, each of which is responsive to a corresponding one of a plurality of controlling conditions of variable value, switching means operative to cause said plurality of adjustale means to be operative, one at a time in a rapid, predetermined sequence which is cyclically repeated, to vary the phase relationship between the voltage in said output circuit and the first mentioned voltage, said relationship at any time being varied in accordance with the particular one of said adjustable means which is operative at that time, and hence, in accordance with the value of the corresponding one of said conditions, and control means through which said phase shifter makes said tube conductive and makes said deflecting means inoperative immediately thereafter during a portion of each cycle of alternation of the first mentioned voltage, said portion being dependent for its position in one of said cycles on the instantaneous value of a corresponding one of said conditions, and being dependent for its position in others of said cycles on the corresponding instantaneous values of others of said conditions, whereby a plurality of luminous pointer lines is produced simultaneously on said screen, due to the persistence of the latter and to persistence of vision, each of said pointer lines extending radially from said circular path to the center of said screen and being angularly positioned around the axis of said tube in accordance with the instantaneous value of a corresponding one of said conditions, and means included in said condition-sensitive phase shifter and operative to characterize each of said pointer lines in a predetermined manner to associate said line with only a corresponding one of said conditions.

24. Apparatus as specified in claim 23 wherein said condition-sensitive phase shifter includes a phase shifting bridge circuit having an input circuit adapted to be connected to the second mentioned source of alternating voltage and having an output circuit connected to said control means, a plurality of adjustable impedances, switching means including a plurality of sequentially operated contacts operative to connect said impedances one at a time in one of the arms of said bridge circuit in a rapid, predetermined sequence which is cyclically repeated, and separate means connected to each of said adjustable impedances, each operative to adjust the value of the corresponding one of said impedances in accordance with the value of a corresponding one of said conditions, the phase relationship between the voltage applied to said control means and the voltage of said second mentioned source being dependent at any time on the instantaneous value of the particular one of said adjustable impedances which is at that time connected by said switching means into said one bridge arm.

25. Apparatus as specified in claim 23 wherein said condition-sensitive phase shifter includes a plurality of phase shifting bridge circuits each of which includes an input circuit and an output circuit and an adjustable impedance connected in one bridge arm, separate means connected to each of said adjustable impedances, each operative to adjust the value of the corresponding one of said impedances in accordance with the value of a corresponding one of said conditions, and switching means including a plurality of sequentially operated contacts operative to connect the input circuits of said bridge circuits one at a time to the second mentioned source of voltage in a rapid, predetermined sequence which is cyclically repeated, and operative to connect the output circuit of each of said bridge circuits to said control means at the same time that the input circuit of the corresponding bridge circuit is connected to said second mentioned source of voltage, the phase relationship between the voltage applied to said control means and the voltage of said second mentioned source being dependent at any time on the instantaneous value of the adjustable impedance included in the particular one of said bridge circuits which is at that time connected by said switching means between said control means and said second mentioned source.

26. Apparatus as specified in claim 23 wherein said condition-sensitive phase shifter includes a plurality of phase shifting bridge circuits each of which includes an input circuit and an output circuit and an adjustable impedance controlled in accordance with the value of one of said conditions, each of said bridge circuits being operative to produce an alternating output voltage in its output circuit when the associated input circuit is supplied with alternating voltage, and being operative to vary within a predetermined range the phase relationship between the output voltage of the particular bridge and the input voltage supplied thereto in accordance with the value of the corresponding one of said conditions, the range through which said phase relationship is variable for each of said bridge circuits being different from and not overlapping that for each of the other of said bridge circuits, whereby each of said simultaneously produced luminous pointer lines is limited in its angular motion on said screen to a separate segmental portion thereof which is associated with only the corresponding one of said conditions, and switching means operative to connect said bridge circuits one at a time between the second mentioned source of voltage and said control means in a rapid, predetermined sequence which is cyclically repeated.

27. Apparatus as specified in claim 23 wherein said condition-sensitive phase shifter includes a phase shifting bridge circuit having an input circuit adapted to be connected to the second mentioned source of alternating voltage and having an output circuit connected to said control means, a plurality of adjustable impedances, switching means including a plurality of sequentially operated contacts operative to connect said impedances one at a time in one of the arms of said bridge circuit in a rapid, predetermined sequence which is cyclically repeated, separate means connected to each of said adjustable impedances, each operative to adjust the value of the corresponding one of said impedances in accordance with the value of a corresponding one of said conditions, and characterizing means operative to vary the magnitude of the alternating voltage supplied from said first mentioned source of voltage to said beam deflecting means, including voltage changing means and contact means operated in synchronism with said switching means and operative to deliver to said beam deflecting means an alternating voltage the magnitude of which is a predetermined value when one of said variable impedances is connected in said bridge arm, and is a respectively different value when each of the other of said variable impedances is connected in said bridge arm, whereby each of said simultaneously produced luminous pointer lines is of a predetermined different length which is associated with only the corresponding one of said conditions.

28. The combination with a cathode ray tube adapted to produce an electron beam, of a plurality of beam deflecting elements, means for intermittently energizing said elements at a predetermined frequency comprising a separate amplifying electron tube for each element, each of said electron tubes having a control grid, means for impressing a voltage of said predetermined frequency on the control grid of each of said electron tubes displaced in phase from the voltage impressed on the control grid of each of the other of said electron tubes, a phase shifter arranged for energization by alternating current of said predetermined frequency including a device responsive to variations in the value of a control quantity, and a pulse generator synchronized by the output voltage of said phase shifter to impress a negative voltage pulse on the control grids of said electron tubes during a portion of a cycle of alternation of said current, said portion being dependent for its position in said cycle on the value of said control condition.

29. The combination with a cathode ray tube having a control grid and beam deflecting means arranged for cyclic operation at a predetermined frequency, of means for intermittently energizing said tube during a portion of an operating cycle dependent on a variable quantity, said means including a phase shifter comprising means responsive to the value of said quantity for creating a negative pulse during a portion of said operating cycle dependent on said value, and means actuated by said negative pulse and including a differentiating circuit for impressing a positive pulse on the control grid of said tube.

RUDOLF F. WILD.

REFERENCES CITED

The following references are of record in the file of this patent:

UNITED STATES PATENTS

| Number | Name | Date |
| --- | --- | --- |
| 2,262,245 | Mosely et al. | Nov. 11, 1941 |
| 2,363,941 | Busignies | Nov. 28, 1945 |
| 2,374,817 | Hardy | May 1, 1945 |
| 2,384,484 | Norden et al. | Sept. 11, 1945 |
| 2,397,032 | Mestas | Mar. 19, 1946 |
| 2,406,858 | Shepherd | Sept. 3, 1946 |